(12) United States Patent
Liu et al.

(10) Patent No.: US 6,829,438 B2
(45) Date of Patent: Dec. 7, 2004

(54) ADD/DROP MULTIPLEXING IN WDM OPTICAL NETWORKS

(75) Inventors: Wen Liu, Ottawa (CA); Ping Wai Wan, Kanata (CA); Derrick Remedios, Nepean (CA)

(73) Assignee: Tropic Networks Inc., Kanata (CA)

( * ) Notice: Subject to any disclaimer, the term of this patent is extended or adjusted under 35 U.S.C. 154(b) by 618 days.

(21) Appl. No.: 09/899,151

(22) Filed: Jul. 6, 2001

(65) Prior Publication Data

US 2003/0007209 A1 Jan. 9, 2003

(51) Int. Cl.[7] ................................................ H04J 14/02
(52) U.S. Cl. ........................... 398/83; 398/79; 398/82; 398/85; 398/182; 398/183; 398/91; 398/59; 385/24; 385/37
(58) Field of Search ............................. 398/79, 82, 83, 398/85, 182, 183, 91, 59; 385/24, 37

(56) References Cited

U.S. PATENT DOCUMENTS

| | | | |
|---|---|---|---|
| 5,999,291 A | | 12/1999 | Anderson .................... 359/133 |
| 6,243,179 B1 | * | 6/2001 | Thompson et al. ............ 398/9 |
| 6,285,479 B1 | * | 9/2001 | Okazaki et al. ............... 398/56 |
| 6,626,590 B1 | * | 9/2003 | Nagatsu et al. .............. 398/59 |
| 6,631,018 B1 | * | 10/2003 | Milton et al. ................ 398/59 |

OTHER PUBLICATIONS

"Arrayed Waveguide Grating DWDM Interleaver", Ding–wei Huang, et al., © 2000 Optical Society of America, pp. WDD80–1 to WDD80–3.

"32 Wavelength Tunable Mode–locked Laser With 100 GHz Channel Spacing Using An Arrayed Waveguide Grating", K. R. Tamura, et al., © 2000 Optical Society of America, pp. TuJ5–1 to TuJ5–3.

"50 GHz spacing, multi–wavelength tunable locker integrated in a transmitter module with a monolithic–modulator and a DFB–laser", K. Tatsuno, et al., Central Research Laboratory, Hitachi Ltd., pp. TuB5–1 to TuB5–4.

* cited by examiner

*Primary Examiner*—Hanh Phan
(74) *Attorney, Agent, or Firm*—Victoria Donnelly

(57) ABSTRACT

In a WDM optical network, optical components of optical add/drop multiplexers (OADMs) at different nodes are made independent of the optical channel wavelengths to be dropped and added. Groups of optical channels each comprise a respective channel in each of a plurality of optical bands of channels having adjacent wavelengths, and the OADMs use tunable optical filters to drop and add channels in a selected group. A remote source supplies unmodulated optical carriers at channel wavelengths via an optical carrier fiber to each node, and at least one, conveniently all, of the optical carriers in a respective optical band is/are modulated with a signal to be transmitted via the add filter.

13 Claims, 5 Drawing Sheets

ADD/DROP MULTIPLEXING IN WDM OPTICAL NETWORKS

REFERENCE TO RELATED APPLICATION

Reference is directed to copending U.S. application Ser. No. 09/839,487 filed Apr. 23, 2001 in the name of J. B. Bacque et al., assigned to Tropic Networks Inc. and entitled "Optical Multiplexer, Demultiplexer And Methods", which describes and claims tunable optical demultiplexer and multiplexer arrangements.

This invention relates to WDM (wavelength division multiplex) optical networks, and is particularly concerned with optical add/drop multiplexing (OADM) in optical WDM networks.

BACKGROUND

In this specification, as is common in the art, terms such as optical add/drop multiplex and OADM are used to embrace not only dropping one or more optical channels from and adding one or more optical channels to an optical signal, but also dropping one or more optical channels without adding any channels, and adding one or more optical channels without dropping any channels, and such terms should be understood and interpreted accordingly.

In addition, although in this specification for clarity and convenience optical signal directions on respective optical paths are described and illustrated, it should be understood that each optical path (e.g. an optical fiber) may simultaneously carry optical signals in opposite directions. Furthermore, optical components may simultaneously operate in opposite manner for optical signals in opposite directions; for example, an optical component which operates as a multiplexer for optical signals in one direction may simultaneously operate as a demultiplexer for optical signals in the opposite direction. Again, the following description is to be understood accordingly.

Optical WDM networks are known in which two or more optical channels are carried on a single optical fiber, each channel comprising an optical signal at a respective wavelength. At any node in the network, it may be desired to terminate one or more of the channels, for which purpose it is known to provide an OADM. An OADM typically comprises one or more optical channel filters and/or one or more optical band filters, where an optical band comprises a plurality of optical channels to be dropped or added. Optical channel and band filters are well known in the art and need not be described here.

The use of OADMs to drop and add individual optical channels or bands provides the advantage that the node-to-node optical connectivity of the network can be different from the physical connectivity of the optical fibers used to carry the channels. For example, the optical fibers may extend between adjacent nodes of a network, whereas the optical connectivity can be such that nodes can be selectively bypassed by some channels, depending upon the optical filters provided at the nodes. Consequently, in known optical networks the optical filters that are provided at each node are typically customized for that node and different from the optical filters provided at other nodes.

It thus becomes necessary to provide a substantial inventory of different optical filters for use in the different nodes, and to keep track of the optical filters that are used in each node. Furthermore, changes at the nodes, for example to drop and add additional or different optical channels, are complicated by the need for customized optical filters for each node.

Consequently, there is a need to provide an OADM and optical network which can enable different nodes to use optical components which are substantially the same for the different nodes and are independent of the particular optical channels which are to be dropped or added at each individual node.

SUMMARY OF THE INVENTION

According to one aspect of this invention there is provided an optical multiplexing arrangement for a WDM (wavelength division multiplex) optical network, comprising: a first optical path for receiving from a remote source a plurality of unmodulated WDM optical carriers at wavelengths of optical channels of the WDM network; a modulator arranged to modulate a signal to be transmitted onto at least a selected one of said WDM optical carriers; and a tunable optical add filter arranged to add to a WDM optical signal on a second optical path said selected one of said plurality of WDM optical carriers modulated with said signal to be transmitted.

Preferably the optical channels comprise groups of optical channels each comprising a respective optical channel in each of a plurality of optical bands, and each optical band comprises a plurality of optical channels having adjacent wavelengths. In one form of the invention the arrangement includes a tuneable drop filter and demultiplexer arranged to select said selected one of said plurality of WDM optical carriers for modulation by said modulator. In a preferred form of the invention the modulator is arranged to modulate said signal to be transmitted onto all of the optical carriers having wavelengths in a respective optical band, and the tunable optical add filter is arranged to select for adding to the WDM signal on the second optical path an optical channel in each of the optical bands.

The invention also provides a WDM optical network comprising a plurality of optical multiplexing arrangements each as recited above optically coupled via respective ones of said second optical paths, and a source of said plurality of unmodulated WDM optical carriers coupled via said first optical path to each optical multiplexing arrangement.

Another aspect of the invention provides an optical add/drop multiplexer (OADM) comprising: an optical path for receiving from a remote source a plurality of unmodulated wavelength division multiplex (WDM) optical carriers at wavelengths of optical channels of a WDM optical network; a modulator arrangement arranged to modulate at least a selected one of said unmodulated optical carriers with a signal to be transmitted to produce an optical signal channel having a selected wavelength; and a tunable optical add filter arranged to add said optical signal channel having said selected wavelength to a WDM optical signal path.

The modulator arrangement can include a tuneable drop filter and demultiplexer arranged to select said selected one of said unmodulated optical carriers for modulation with said signal to be transmitted. Alternatively, the modulator arrangement can comprise a demultiplexer arranged to demultiplex the optical carriers into a plurality of optical bands each comprising a plurality of optical carriers having adjacent wavelengths; one or more modulators each arranged to modulate the plurality of optical carriers of a respective optical band with a respective signal to be transmitted; and a multiplexer arranged to multiplex outputs of the modulators for supply to the optical add filter; the optical add filter being arranged for adding to the WDM optical signal path a group of optical signal channels comprising one optical signal channel having a selected wavelength from each of said optical bands.

The invention further provides a WDM optical network comprising a plurality of OADMs each as recited above optically coupled via the WDM optical signal path, and a source of said plurality of unmodulated WDM optical carriers coupled via said optical path to each OADM.

A further aspect of the invention comprises a method of providing, at each of a plurality of nodes in a wavelength division multiplex (WDM) optical network, an optical add/drop multiplexer (OADM) using optical components which are not dependent upon particular wavelengths of optical channels to be dropped or added at the respective node, comprising the steps of: grouping optical channels into a plurality of groups each comprising a respective optical channel in each of a plurality of optical bands, each optical band comprising a plurality of optical channels having adjacent wavelengths; providing in each OADM at least one tunable optical filter arranged to drop from and/or add to an optical signal path of the network optical channels in a selected one of said groups; supplying from a remote source via an optical carrier path to OADMs in different nodes a plurality of unmodulated optical carriers at wavelengths of optical channels of the network; and in one or more OADMs in which an optical channel is to be added to the optical signal path, modulating at least one of the unmodulated optical carriers having wavelengths in a respective optical band with a signal to be transmitted.

The invention further provides a method of providing unmodulated optical carriers at wavelengths of WDM optical channels to a plurality of nodes in a WDM optical network for use in carrying out the method recited above, comprising the steps of: producing said unmodulated optical carriers at an optical carrier source remote from at least some of said nodes; and distributing said unmodulated optical carriers from the optical carrier source via the optical carrier path to each of said nodes remote from the optical carrier source.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
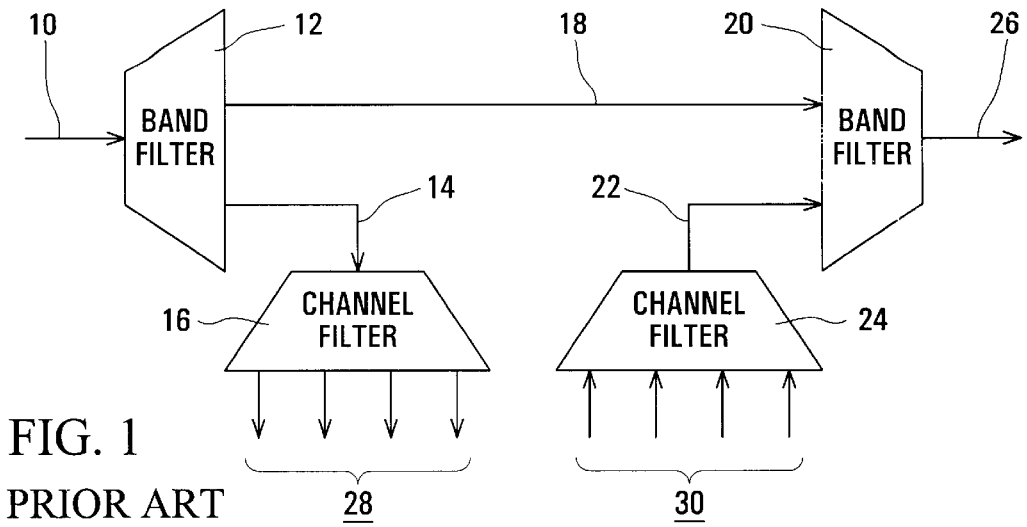
FIG. 1 illustrates a known OADM (optical add/drop multiplexer)

Referring to the drawings, FIG. 1 illustrates a known optical add/drop multiplexer (OADM) for dropping and adding an optical band comprising a plurality of optical channels transmitted in one direction (left to right as shown in FIG. 1) on an optical fiber 10. The OADM of FIG. 1 comprises an optical band filter 12 having an optical input to which the optical fiber 10 is connected, and having two optical outputs one of which is coupled via an optical fiber 14 to an input of an optical channel filter 16 and the other of which is coupled via an optical fiber 18 to one input of an optical band filter 20. A second input of the band filter 20 is coupled via an optical fiber 22 to an output of an optical channel filter 24, and an output of the band filter 20 is coupled to an ongoing optical fiber 26.

The band filter 12 supplies a band of optical channels to be dropped by the OADM to the fiber 14, and supplies other optical channels to the fiber 18. The channel filter 16 demultiplexes the channels of this band into separate optical channels on respective optical fibers 28. Conversely, the channel filter 24 multiplexes optical channels supplied to it via respective optical fibers 30 into a similar or different optical band on the fiber 22, and the band filter 20 multiplexes this band of added optical channels with the other optical channels on the fiber 16.

As is known in the art, where the same optical bands and channels are dropped and added, the optical band filters 12 and 20 can be identical to one another, and the optical channel filters 16 and 24 can be identical to one another. Each filter can comprise an optical filter of known form having a filter wavelength and bandwidth appropriate for the optical band or channels to be dropped or added. Also, as is known in the art, each such filter can be reversible for optical signals in the opposite direction, and the OADM of FIG. 1 can also operate for optical signals in the opposite direction to that shown. Thus for example for optical signals that are transmitted in both directions on a single fiber, a single optical filter can serve both for dropping an optical band or channel in one direction and adding a similar optical band or channel for the opposite direction.

Figure 2:
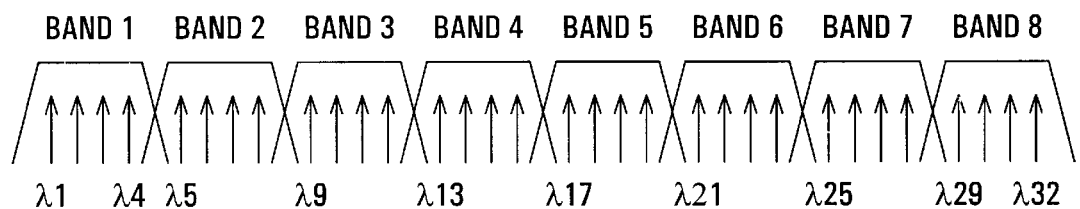
FIG. 2 is a diagram illustrating optical bands and channels of the OADM of FIG. 1.

FIG. 2 is a diagram illustrating one example of the optical bands and channels of the OADM of FIG. 1, in which there are eight optical bands each of four equally-spaced WDM optical channels having adjacent wavelengths; thus there are 32 optical channels having wavelengths $\lambda 1$ to $\lambda 32$. In the OADM of FIG. 1, each of the band filters 12 and 20 must be selected for the particular optical band that is to be dropped and added respectively, and each of the channel filters 16 and 24 must also be selected for the particular set of optical channels to be dropped and added respectively. Thus OADMs in the nodes of an optical network must in this case be customized individually for the particular optical bands and channels to be dropped and added.

Figure 3:
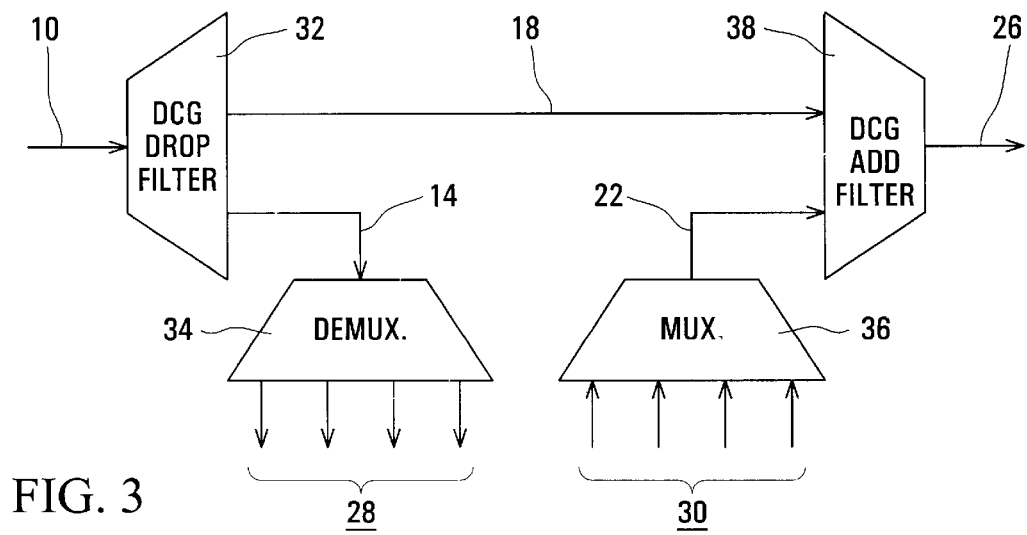
FIG. 3 illustrates another OADM which uses distributed channel groups (DCGs)

FIG. 3 illustrates an OADM using distributed channel groups (DCGs). In the OADM of FIG. 3, the optical fiber 10 is connected to an optical input of a tunable DCG drop filter 32 having optical outputs to the fibers 14 and 18, and the fiber 14 is connected to an input of an optical demultiplexer 34 whose outputs constitute the optical channels on the fibers 28. Conversely, an optical multiplexer 36 multiplexes optical channels supplied to it via the fibers 30 onto the fiber 22, and a tunable DCG add filter 38 receives optical signals from the fibers 18 and 22 and supplies an ongoing optical signal to the fiber 26.

Figure 4:
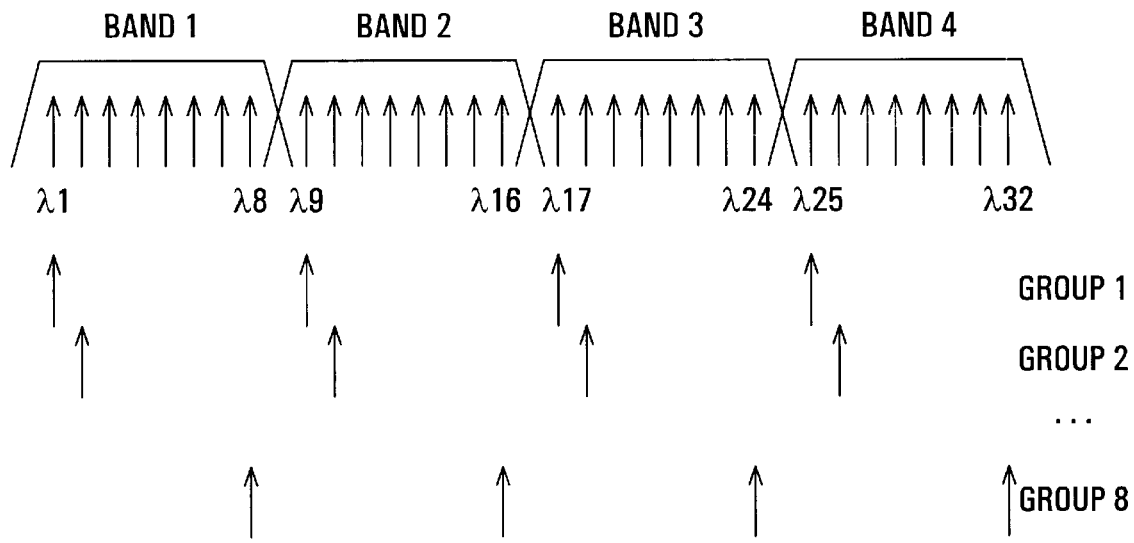
FIG. 4 is a diagram illustrating optical bands and channels of the OADM of FIG. 3.

FIG. 4 is a diagram illustrating one example of operation of the OADM of FIG. 3. As in the case of FIG. 2, there are 32 optical channels having wavelengths $\lambda 1$ to $\lambda 32$, but in this case the channels are arranged in eight groups each of which comprises a respective one of eight adjacent-wavelength channels in each of four relatively broad channel bands. Thus for example as shown in FIG. 4 band 1 comprises channels with adjacent wavelengths λ1 to λ8, band 2 comprises channels with adjacent wavelengths λ9 to λ16, band 3 comprises channels with adjacent wavelengths λ17 to λ24, and band 4 comprises channels with adjacent wavelengths λ25 to λ32.

Also as shown in FIG. 4, group 1 comprises the four optical channels having wavelengths λ1, λ9, λ17, and λ25, i.e. the first channel in each band, group 2 comprises the four optical channels having wavelengths λ2, λ10, λ18, and λ26, i.e. the second channel in each band, and so on for the other groups with group 8 comprising the four optical channels having wavelengths λ8, λ16, λ24, and λ32.

The tunable DCG drop filter 32 is arranged and tuned, for example as described further below, to supply any one of the eight distributed channel groups to the fiber 14. The optical demultiplexer 34, for example constituted by an optical filter having four outputs corresponding to the relatively wide bands 1 to 4 respectively illustrated in FIG. 4, demultiplexes the four optical channels, regardless of to which of the eight groups they belong, onto respective ones of the fibers 28. Conversely the multiplexer 36, which can be the same as the demultiplexer 34, multiplexes the four channels of any of the eight groups onto the fiber 22, and the tunable DCG add filter 38, which can be similar to the tunable DCG drop filter 32 as further described below, multiplexes the optical signals from the fibers 18 and 22 onto the fiber 26.

Figure 5:
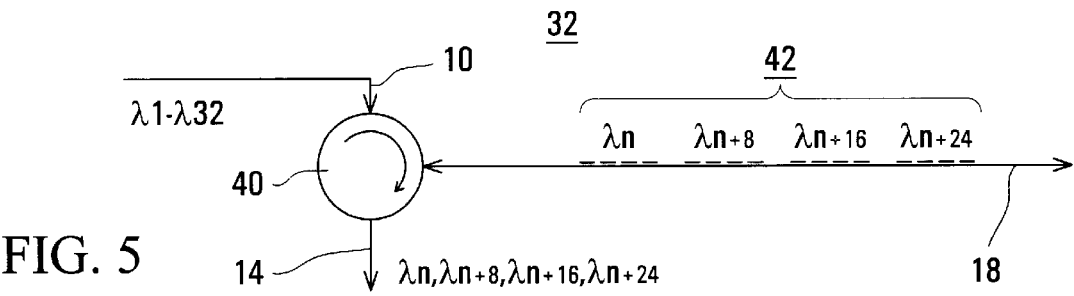
FIG. 5 illustrates one form of DCG filter which can be used in the OADM of FIG. 3.

FIG. 5 illustrates one form of the tunable DCG drop filter 32, which comprises an optical circulator 40 and four (in this example) Bragg fiber reflection gratings 42. The fiber 10 is coupled to a first port of the circulator 40 to supply the optical channels at wavelengths λ1 to λ32 to the circulator. A second port of the circulator is coupled via the gratings 42 to the fiber 18, and a third port of the circulator 40 is coupled to the fiber 14. The four gratings 42 are arranged to reflect optical signals at wavelengths λn, $\lambda_{n+8}$, $\lambda_{n+16}$, and $\lambda_{n+24}$ respectively where n is a number from 1 to 8 and corresponds to a respective group of channels as described above. The value of n is determined by tuning, for example by bending of the fiber gratings 42. Consequently, the respective tuned group of channels is reflected back to the circulator 40 to appear at its third port and hence on the fiber 14, whereas optical channels at other wavelengths continue on the fiber 18.

The tunable DCG add filter 38 can be similar to the tunable DCG drop filter of FIG. 5, and can be tuned for the same or a different group of channels, the optical signal directions on the fibers and in the optical circulator being reversed.

The tunable DCG add and drop filters can alternatively have any other desired form, for example instead using fiber Bragg grating optical interleaving techniques employing arrayed waveguide gratings or multiple-stage Mach-Zehnder interleavers.

It can be appreciated that the OADM of FIG. 3 can be tuned for and used with any of the various groups of channels which may be dropped and added, so that this single form of the OADM can be used in different nodes throughout an optical network. This provides a substantial advantage compared with the OADM of FIG. 1.

Figure 6:
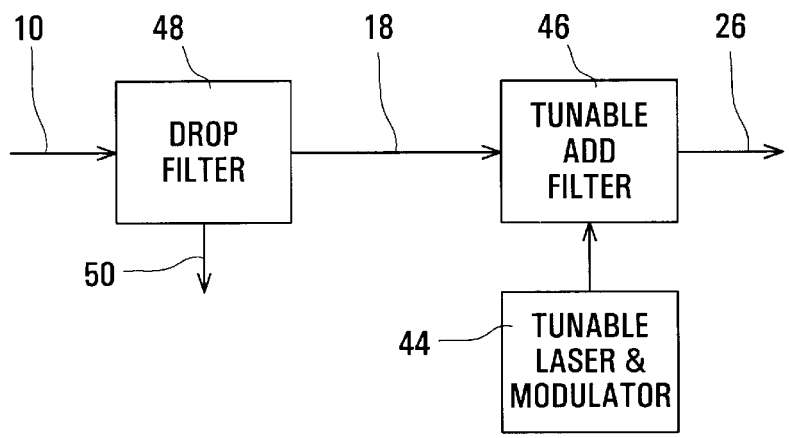
FIG. 6 illustrates another arrangement of the OADM of FIG. 3.

However, it remains necessary in nodes of an optical network using the OADM of FIG. 3 to provide tunable lasers, or other tunable optical sources, to provide optical carriers, which are modulated to produce the respective optical channels, at the respective wavelengths. For example, FIG. 6 illustrates a modification of the OADM arrangement of FIG. 3, in which a tunable laser and modulator 44 provides an optical channel to a tunable add filter 46, to be communicated via the fiber 26, and in this case a fixed (or tunable) drop filter 48 provides a dropped optical channel on a fiber 50.

Such an arrangement is useful for example in a ring network in which each node is allocated at least one respective wavelength for receipt of a corresponding optical channel, the drop filter 48 serving to drop this respective optical channel. To permit a node to transmit to any other node, the transmitting node tunes its tunable laser to the wavelength of an optical channel for that other node, and modulates the resulting optical carrier with a signal to be transmitted. The resulting optical channel is added to the optical signal being propagated around the ring using the tunable add filter, this being tuned to the respective wavelength to add the optical channel without adversely affecting other optical channels. The drop filter 48 and the tunable add filter 46 can have forms as described above, so that different nodes allocated different wavelengths can use common optical components.

A disadvantage of such an arrangement is that the tunable laser 44 must operate in accordance with strict criteria for proper operation of the WDM network, and these criteria become increasingly more strict with an increasing number of WDM channels. Consequently, the tunable laser and its associated circuits are relatively costly.

Figure 7:
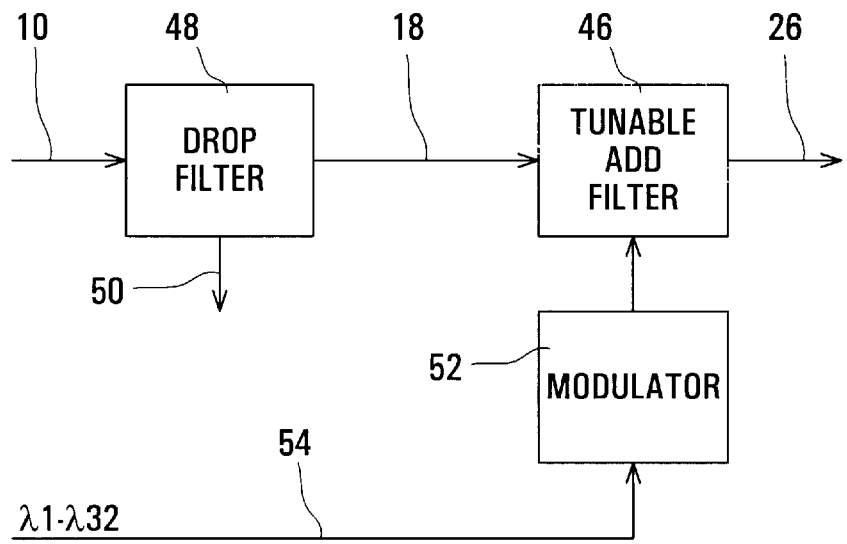
FIG. 7 illustrates an OADM arrangement in accordance with an embodiment of this invention.

FIG. 7 illustrates an OADM arrangement in accordance with an embodiment of this invention, in which this disadvantage is avoided.

In the OADM arrangement of FIG. 7, instead of a tunable laser and modulator 44 as in the arrangement of FIG. 6, a modulator 52 is supplied, via a fiber 54 from a remote source (not shown in FIG. 7), with all of the optical carrier wavelengths which it may require for communication with another node. As illustrated in FIG. 7, optical carriers at all of the wavelengths λ1 to λ32 are provided on the fiber 54, but it can be appreciated that a subset of such wavelengths may be provided if only wavelengths in that subset may be required.

The modulator 52 modulates a signal to be transmitted onto all of the optical carriers with which it is supplied, to produce a plurality of optical signals at respective wavelengths at its output. One of these, determined by the tunable add filter 46, is selected and added to the optical signal transmitted on the fiber 26.

It can be appreciated that in any particular implementation of this node arrangement the form of the tunable add filter 46 can depend on the selection of optical carrier wavelengths that are supplied to the modulator 52 via the fiber 54. For example, if the modulator 52 is supplied via the fiber 54 with only a subset of the optical carriers within one band, for example with only the wavelengths λ1 to λ8, then the tunable add filter 46 can comprise a tunable DCG add filter 38 as described above without a multiplexer 36. In this respect, other arrangements will readily present themselves to those of ordinary skill in the art and this aspect of the invention is not limited to any particular implementation.

In addition, it can be appreciated that particular optical carrier wavelengths can be selected from the total of wavelengths on the fiber 54 in any desired manner, such as using an optical wavelength demultiplexer which may for example comprise cascaded optical filters or an arrayed waveguide grating.

Figure 8:
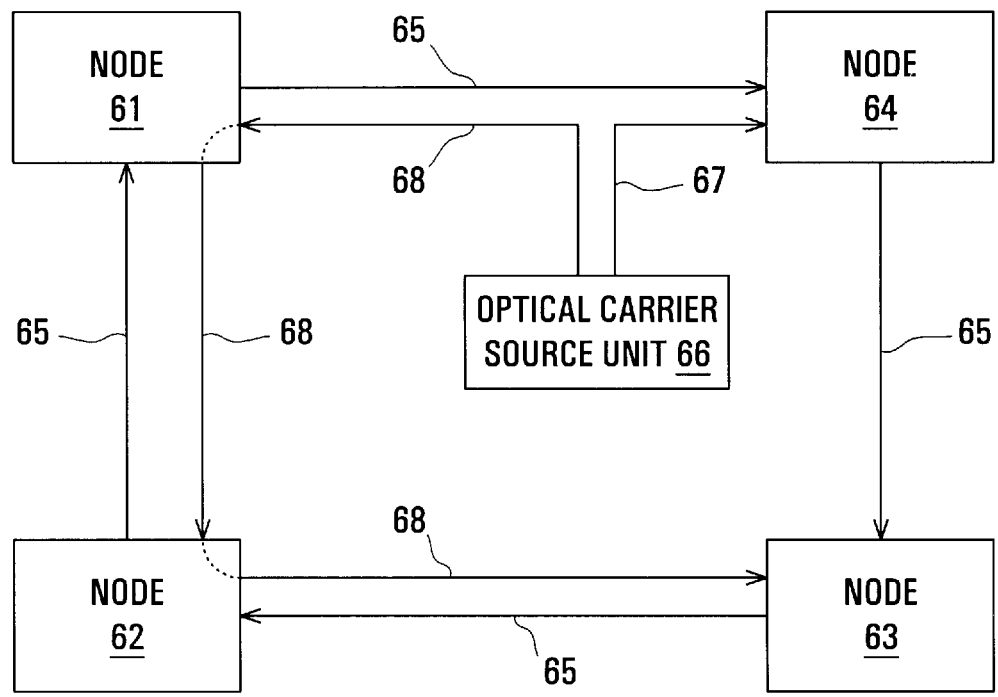
FIG. 8 illustrates an optical network in accordance with an embodiment of this invention.

By way of further example, FIG. 8 illustrates an optical network in which four nodes 61 to 64 are arranged for communication with one another via a ring of optical signal fibers 65, corresponding to the fibers 10 and 26 described above. For simplicity, FIG. 8 illustrates a unidirectional ring and only four nodes, and it can be appreciated that in practice a network may have an arbitrary number of nodes linked via one or more fibers for unidirectional or bidirectional transmission, in an arbitrary arrangement which may comprise single or multiple ring, star, bus, and/or mesh configurations.

FIG. 8 also illustrates that the network includes an optical carrier source unit 66, which provides a central source for the optical carrier wavelengths (e.g. $\lambda 1$ to $\lambda 32$ as described above) which are used by the network nodes 61 to 64. Although in FIG. 8 the unit 66 is illustrated as being separate from the nodes 61 to 64, it can be provided separately from or incorporated into one of the nodes of the network. Furthermore, although only one such unit is illustrated in FIG. 8, it can be appreciated that a plurality of such units may be provided in a network, and/or different such units may be provided for providing respective subsets of the optical carrier wavelengths.

Optical carriers at respective wavelengths are provided by the unit 66 and are supplied via optical carrier fibers 67, 68 to supply wavelengths as desired to the respective nodes 61 to 64. The optical carrier fibers 67, 68 may also be provided in various ring, star, bus, and/or mesh configurations as may be desired. For example, FIG. 8 illustrates that the optical fibers 67 and 68 extend in a star configuration from the unit 66 to the nodes 64 and 61 respectively, and that the optical carrier fiber 68 is coupled through and extended from the nodes 61 and 62 to reach the nodes 62 and 63 respectively.

The optical fibers 67, 68 in FIG. 8 correspond to the fiber 54 in the arrangement of FIG. 7. It can be appreciated that in this or an equivalent manner, optical carriers at desired wavelengths can be produced at one or more source locations, where economies of scale can be taken advantage of to facilitate providing the optical carrier wavelengths with the required characteristics in the most practical and economic manner, and can be distributed as desired via one or more optical carrier fibers to network nodes for use as described above.

In this respect, it is observed that the optical carrier wavelengths can be treated as a commodity, being distributed via the fibers 67, 68 (which are distinct from the optical signal fibers 65 although they can follow similar or different routes) to network nodes or customers on an as-needed basis, and being paid for accordingly, in a similar manner to the distribution of other service commodities such as cable television, water, gas, and electricity via their respective distribution channels.

By way of example, the optical carrier source unit 66 can comprise one or more fiber ring Fabry-Perot lasers, or integrated laser arrays, to produce the multiple optical carriers at wavelengths corresponding to the respective optical channels. Temperature control circuitry can be shared among the multiple optical carriers, so that the per-channel cost of optical carriers provided by the unit 66 can be substantially less than the cost of providing individual tuned lasers in each node of the network.

Figure 9:
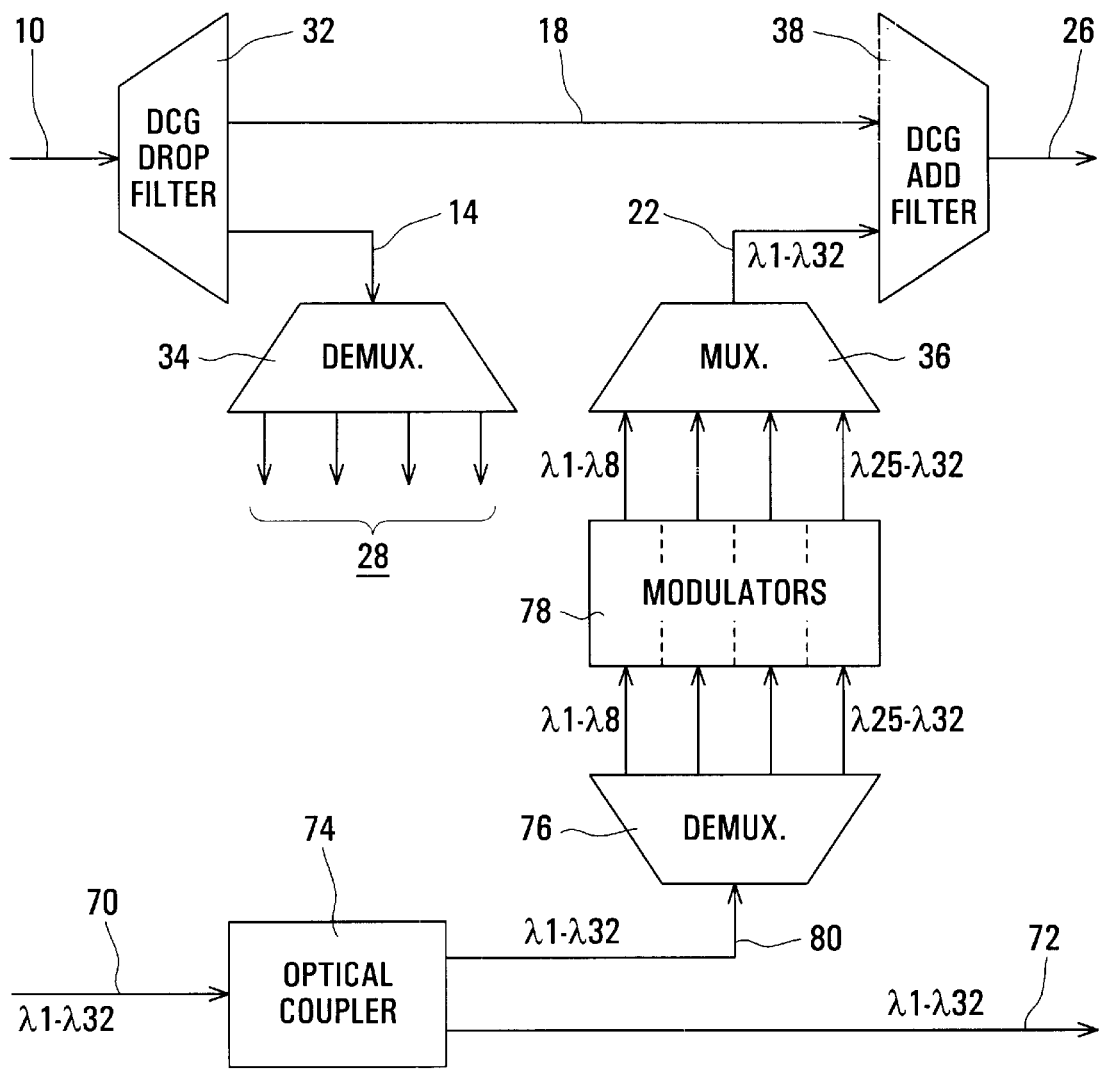
FIG. 9 illustrates an OADM arrangement in accordance with another embodiment of this invention.

FIG. 9 illustrates in greater detail an OADM arrangement in accordance with another embodiment of this invention. In FIG. 9, the optical fibers 10, 14, 18, 22, 26, and 28, DCG drop filter 32 and add filter 38, and optical demultiplexer 34 and multiplexer 36 are provided in the same manner and arrangement as in FIG. 3 as described above. The arrangement of FIG. 9 also includes incoming and coupled-through optical carrier fibers 70 and 72 respectively which correspond to the fiber 68 in FIG. 8, an optical coupler 74, an optical demultiplexer 76 which can be the same as the demultiplexer 34, and four optical signal modulators 78 which for example can be electrical absorber modulators.

As shown in FIG. 9, the optical carrier wavelengths $\lambda 1$ to $\lambda 32$ from the remote source are supplied via the optical coupler 74 to the fiber 72 and via another fiber 80 to an input of the demultiplexer 76. The coupler 74 can be a 3 dB coupler or any other desired form of optical coupler or power splitter, and if desired may include an optical amplifier to maintain a desired optical carrier power on the fiber 72. All of the carrier wavelengths $\lambda 1$ to $\lambda 32$ are coupled to the fiber 80 as well as to the fiber 72.

The demultiplexer 76 demultiplexes the optical carrier wavelengths on the fiber 80 into the four bands described above with reference to FIG. 4, i.e. into bands comprising optical carrier wavelengths $\lambda 1$ to $\lambda 8$, $\lambda 9$ to $\lambda 16$, $\lambda 17$ to $\lambda 24$, and $\lambda 25$ to $\lambda 32$ respectively. The optical carrier wavelengths within these bands are modulated by respective signals (not shown) in respective ones of the four modulators 78, and the resulting modulated signals are supplied to respective ones of the four inputs of the multiplexer 36. Although all of the eight optical carriers in each band are thereby modulated by a respective one of the modulators, and all of the modulated optical carriers at wavelengths $\lambda 1$ to $\lambda 32$ are thereby multiplexed onto the fiber 22 as indicated in FIG. 9, only the desired group of modulated optical carrier wavelengths is supplied to the fiber 26 by the tuning as described above of the DCG add filter 38.

Figure 10:
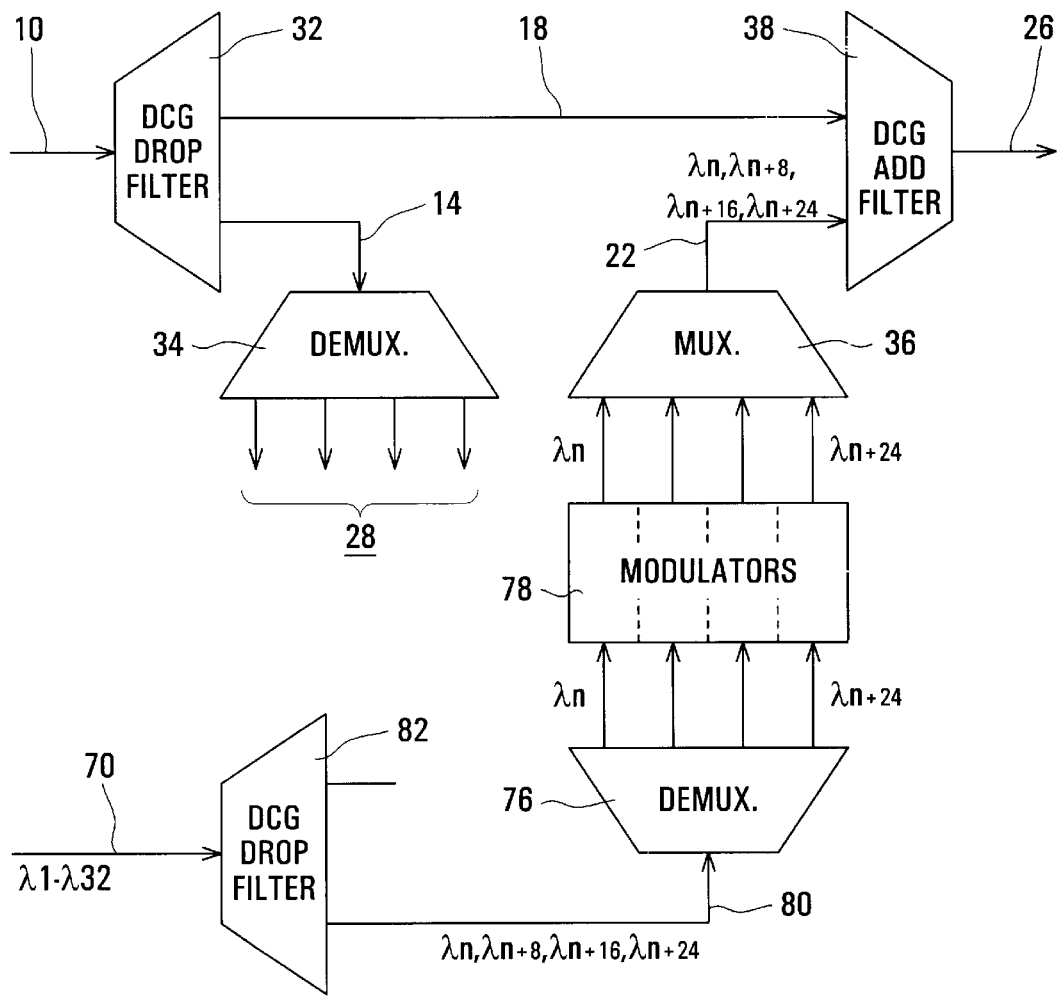
FIG. 10 illustrates another OADM arrangement in accordance with a further embodiment of this invention.

FIG. 10 illustrates another OADM arrangement, in accordance with a further embodiment of this invention, which is similar to the OADM arrangement of FIG. 9. In the OADM arrangement of FIG. 10, the optical carrier wavelengths $\lambda 1$ to $\lambda 32$ from the remote source are supplied via the optical fiber 70 to an input of another DCG drop filter 82 which is tuned to the same wavelengths $\lambda_n$, $\lambda_{n+8}$, $\lambda_{n+16}$, and $\lambda_{n+24}$, where n is a number from 1 to 8 and corresponds to a respective group of channels as described above, as the DCG add filter 38. The DCG drop filter 82 replaces or supplements the optical coupler 74 in the OADM arrangement of FIG. 9. Consequently in the OADM arrangement of FIG. 10 only the optical carrier wavelengths in this group are present on the optical fiber 80 and are modulated with respective signals to be transmitted in respective ones of the modulators 78. The OADM arrangement of FIG. 10 is not especially preferred over the OADM arrangement of FIG. 9 because the OADM arrangement of FIG. 10 requires the additional DCG filter 82, either in addition to or in place of the optical coupler 74.

It can be appreciated that in the arrangements of FIGS. 7, 9, and 10 all of the components can be independent of the particular wavelengths that are being dropped, added, and/or modulated. Consequently, such a single form of the OADM can be used throughout an optical network, regardless of the particular wavelengths added and dropped in the nodes, and thereby facilitating easy and convenient reconfiguration of the network, for example for adding and dropping additional wavelengths or modifying wavelength routing in the network. Furthermore, these advantages are provided without requiring tunable laser sources in the individual nodes.

The various optical components such as multiplexers, demultiplexers, optical filters, etc. of the OADM arrangements described above can each have any of a variety of forms as may be desired in particular circumstances, and the invention is not limited to any particular forms of these components. Depending upon the particular forms of these optical components, the OADM arrangements can be provided partly or entirely using photonic integrated circuits, thereby further facilitating implementation of the OADM arrangements.

Although particular embodiments of the invention and variations have been described above in detail above, it can be appreciated that numerous modifications, variations, and adaptations may be made without departing from the scope of the invention as defined in the claims.

What is claimed is:

1. An optical multiplexing arrangement for a WDM (wavelength division multiplex) optical network, comprising:
   a first optical path for receiving from a remote source a plurality of unmodulated WDM optical carriers at wavelengths of optical channels of the WDM network;
   a modulator arranged to modulate a signal to be transmitted onto at least a selected one of said WDM optical carriers; and
   a tunable optical add filter arranged to add to a WDM optical signal on a second optical path said selected one of said plurality of WDM optical carriers modulated with said signal to be transmitted,
   wherein the optical channels comprise groups of optical channels each comprising a respective optical channel in each of a plurality of optical bands, each optical band comprises a plurality of optical channels having adjacent wavelengths, and the arrangement includes a tuneable drop filter and demultiplexer arranged to select said selected one of said plurality of unmodulated optical carriers for modulation by said modulator.

2. An optical multiplexing arrangement as claimed in claim 1 wherein the optical channels comprise groups of optical channels each comprising a respective optical channel in each of a plurality of optical bands, each optical band comprises a plurality of optical channels having adjacent wavelengths, the modulator is arranged to modulate said signal to be transmitted onto all of the optical carriers having wavelengths in a respective optical band, and the tunable optical add filter is arranged to select for adding to the WDM signal on the second optical path an optical channel in each of the optical bands.

3. An optical multiplexing arrangement as claimed in claim 2 and including an optical drop filter in the second optical path.

4. An optical multiplexing arrangement as claimed in claim 3 wherein the optical drop filter is arranged to select and drop from the WDM signal on the second optical path the optical channels of one of said groups of optical channels.

5. An optical multiplexing arrangement as claimed in claim 2 and including an optical demultiplexer arranged to demultiplex the unmodulated WDM optical carriers into said plurality of optical bands for supply to respective ones of a corresponding plurality of modulators each arranged for modulating a respective signal to be transmitted onto all of the optical carriers in the respective optical band.

6. An optical multiplexing arrangement as claimed in claim 5 and including an optical multiplexer arranged to multiplex modulated optical carriers produced by the modulators for supply to the tunable optical add filter.

7. A WDM optical network comprising a plurality of optical multiplexing arrangements each as claimed in claim 1 optically coupled via respective ones of said second optical paths, and a source of said plurality of unmodulated WDM optical carriers coupled via said first optical path to each optical multiplexing arrangement.

8. An optical add/drop multiplexer (OADM) comprising:
   an optical path for receiving from a remote source a plurality of unmodulated wavelength division multiplex (WDM) optical carriers at wavelengths of optical channels of a WDM optical network;
   a modulator arrangement arranged to modulate at least a selected one of said unmodulated optical carriers with a signal to be transmitted to produce an optical signal channel having a selected wavelength; and
   a tunable optical add filter arranged to add said optical signal channel having said selected wavelength to a WDM optical signal path,
   wherein the modulator arrangement comprises:
   a demultiplexer arranged to demultiplex the optical carriers into a plurality of optical bands each comprising a plurality of optical carriers having adjacent wavelengths;
   one or more modulators each arranged to modulate the plurality of optical carriers of a respective optical band with a respective signal to be transmitted; and
   a multiplexer arranged to multiplex outputs of the modulators for supply to the optical add filter;
   wherein the optical add filter is arranged for adding to the WDM optical signal path a group of optical signal channels comprising one optical signal channel having a selected wavelength from each of said optical bands.

9. An OADM as claimed in claim 8 and including an optical drop filter arranged to select and drop from the WDM optical signal path a group of optical signal channels comprising one optical signal channel having a selected wavelength from each of said optical bands.

10. A WDM optical network comprising a plurality of OADMs each as claimed in claim 8 optically coupled via the WDM optical signal path, and a source of said plurality of unmodulated WDM optical carriers coupled via said optical path to each OADM.

11. A method of providing, at each of a plurality of nodes in a wavelength division multiplex (WDM) optical network, an optical add/drop multiplexer (OADM) using optical components which are not dependent upon particular wavelengths of optical channels to be dropped or added at the respective node, comprising the steps of:
   grouping optical channels into a plurality of groups each comprising a respective optical channel in each of a plurality of optical bands, each optical band comprising a plurality of optical channels having adjacent wavelengths;
   providing in each OADMs at least one tunable optical filter arranged to drop from and/or add to an optical signal path of the network optical channels in a selected one of said groups;
   supplying from a remote source via an optical carrier path to OADMs in different nodes a plurality of unmodulated optical carriers at wavelengths of optical channels of the network; and in one or more OADMs in which an optical channel is to be added to the optical signal path, modulating at least one of the unmodulated optical carriers having wavelengths in a respective optical band with a signal to be transmitted, wherein the step of modulating comprises modulating a plurality of the unmodulated optical carriers having wavelengths in the respective optical band with the signal to be transmitted.

12. A method as claimed in claim 11 and comprising the step of demultiplexing, in said one or more OADMs, the unmodulated optical carriers into said optical bands each for supply to a respective modulator of the respective OADM.

13. A method as claimed in claim 11 and comprising the step of selecting one of the unmodulated optical carriers having wavelengths in the respective optical band for modulation with the signal to be transmitted.

* * * * *